United States Patent
Apostolos et al.

(10) Patent No.: US 11,105,882 B2
(45) Date of Patent: Aug. 31, 2021

(54) ORIENTATION INDEPENDENT ANTENNAS WITH DIRECTION FINDING FOR REMOTE KEYLESS ENTRY

(71) Applicant: Antenum LLC, Merrimack, NH (US)

(72) Inventors: John T. Apostolos, Lyndeborough, NH (US); William Mouyos, Windham, NH (US); James D. Logan, Candia, NH (US)

(73) Assignee: ANTENUM, INC., Merrimack, NH (US)

(*) Notice: Subject to any disclaimer, the term of this patent is extended or adjusted under 35 U.S.C. 154(b) by 315 days.

(21) Appl. No.: 16/358,900

(22) Filed: Mar. 20, 2019

(65) Prior Publication Data
US 2019/0346531 A1 Nov. 14, 2019

Related U.S. Application Data

(60) Provisional application No. 62/645,477, filed on Mar. 20, 2018.

(51) Int. Cl.
| | |
|---|---|
| *B60R 25/24* | (2013.01) |
| *G01S 3/18* | (2006.01) |
| *B60R 25/045* | (2013.01) |
| *B60R 25/102* | (2013.01) |
| *B60R 25/20* | (2013.01) |
| *B60R 25/30* | (2013.01) |

(Continued)

(52) U.S. Cl.
CPC .............. *G01S 3/18* (2013.01); *B60R 25/045* (2013.01); *B60R 25/102* (2013.01); *B60R 25/209* (2013.01); *B60R 25/24* (2013.01); *B60R 25/30* (2013.01); *G01S 3/50* (2013.01); *G01S 5/06* (2013.01); *H01Q 1/3233* (2013.01); *H01Q 1/3241* (2013.01); *H01Q 25/02* (2013.01); *B60R 2325/205* (2013.01); *G08B 21/24* (2013.01)

(58) Field of Classification Search
CPC ...... G01S 3/18; G01S 3/50; G01S 5/06; B60R 25/045; B60R 25/102; B60R 25/209; B60R 25/24; B60R 25/30; H01Q 1/3233; H01Q 25/02; G08B 21/24
See application file for complete search history.

(56) References Cited

U.S. PATENT DOCUMENTS

| 4,314,251 A | 2/1982 | Raab | |
|---|---|---|---|
| 5,274,390 A * | 12/1993 | Breakall | ............. H01Q 11/10 343/792.5 |

(Continued)

OTHER PUBLICATIONS

International Search Report and Written Opinion dated Jul. 16, 2019 for Related PCT/US19/23078.

*Primary Examiner* — Munear T Akki
(74) *Attorney, Agent, or Firm* — VLP Law Group LP; David J. Thibodeau, Jr.

(57) ABSTRACT

An improved remote keyless entry (RKE) system for a vehicle to provide enhanced capabilities to a user. The improved RKE system may utilize directional antennas in the vehicle and in the FOB. Directional antennas may utilize devices equipped with orientation-independent antennas to determine the location. The system can exist in many different customizable configurations, sometimes utilizing orientation-independent antennas embedded in the vehicle or the FOB. The devices, systems and methods described herein may be used for an RKE in personal or commercial vehicles.

7 Claims, 14 Drawing Sheets

(51) Int. Cl.
*G01S 3/50* (2006.01)
*G01S 5/06* (2006.01)
*H01Q 1/32* (2006.01)
*H01Q 25/02* (2006.01)
*G08B 21/24* (2006.01)

(56) References Cited

U.S. PATENT DOCUMENTS

| | | | | |
|---|---|---|---|---|
| 7,215,238 | B2* | 5/2007 | Buck | G07C 9/00309 |
| | | | | 318/16 |
| 10,471,931 | B2* | 11/2019 | Naitou | G07C 9/00309 |
| 2002/0024417 | A1* | 2/2002 | Morrison | G07C 9/00857 |
| | | | | 340/5.25 |
| 2008/0048828 | A1* | 2/2008 | Buccinna | B60R 25/24 |
| | | | | 340/5.72 |
| 2009/0073049 | A1* | 3/2009 | Apostolos | H01Q 21/20 |
| | | | | 343/700 MS |
| 2009/0096691 | A1* | 4/2009 | Apostolos | H01Q 11/12 |
| | | | | 343/742 |
| 2010/0171642 | A1 | 7/2010 | Hassan et al. | |
| 2013/0214900 | A1* | 8/2013 | Mitchell | G07C 9/00309 |
| | | | | 340/5.61 |
| 2014/0253287 | A1 | 9/2014 | Bauman et al. | |
| 2014/0342668 | A1* | 11/2014 | Kyomitsu | G07C 9/00944 |
| | | | | 455/41.2 |
| 2015/0077253 | A1 | 3/2015 | Spahl et al. | |
| 2016/0098870 | A1* | 4/2016 | Bergerhoff | B60R 25/2018 |
| | | | | 340/5.61 |
| 2018/0191072 | A1* | 7/2018 | Apostolos | H01Q 21/29 |
| 2019/0318563 | A1* | 10/2019 | Atsumi | B60R 25/002 |

* cited by examiner

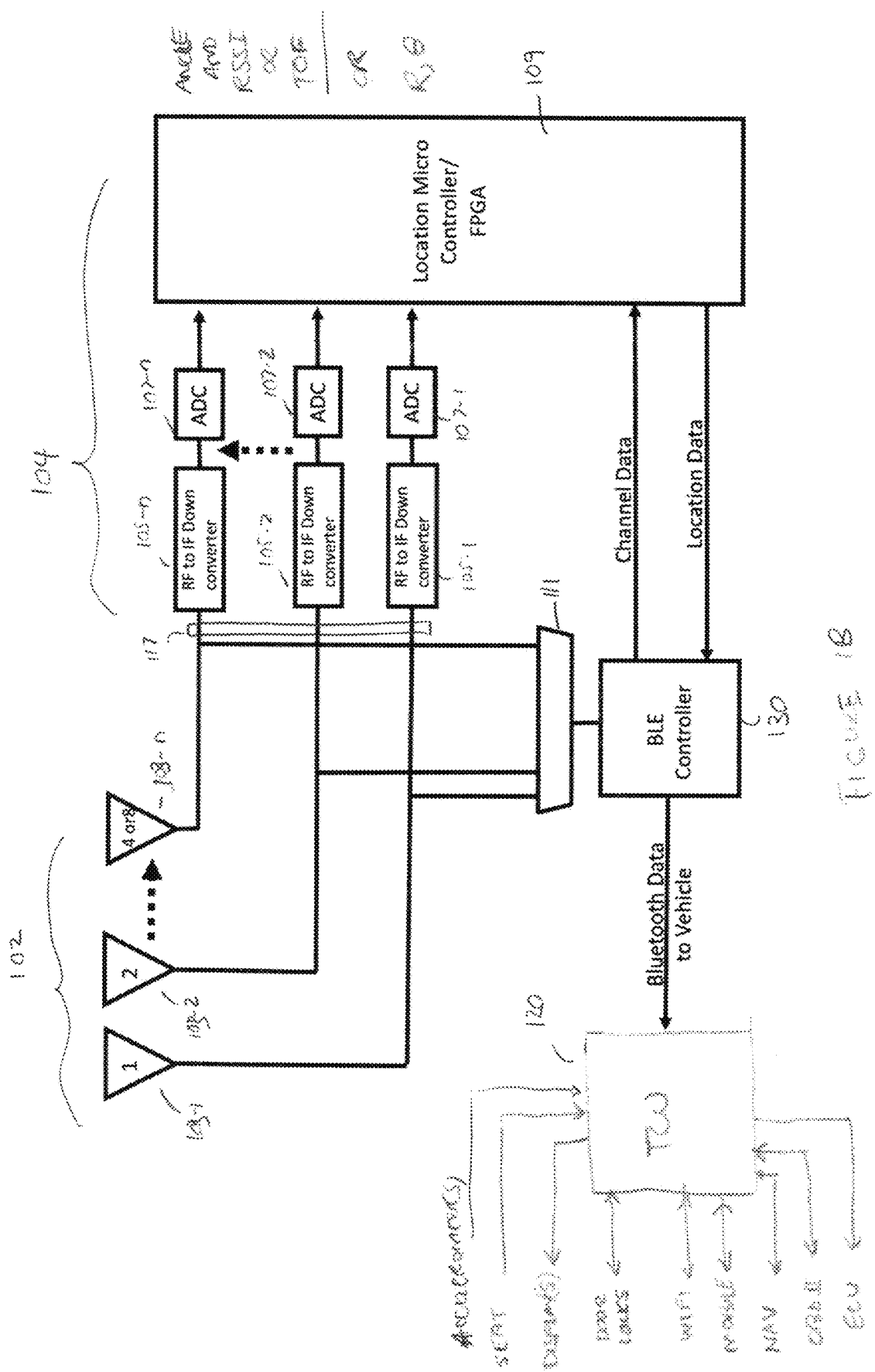

$$\text{output} = Ve^{i\varphi} + H\,i\,e^{i\varphi}$$
$$\text{if } H = \alpha V$$
$$\text{out} = Ve^{i\varphi}(i + \alpha i)$$

1) $\dfrac{\text{out}}{V} = e^{i\varphi}(i + \alpha i)$

Get V from the $\Sigma$Port
Get H from an RN Overlayed
Wire Loop on Top of the ORIAN With $\alpha = \dfrac{V}{H}$ Solve
Eqn 1) for the
Azimuth Angle, $\sin\varphi \cong \dfrac{H}{V}$, the Elevation Angle ANTENNA ARRAY on vehicle PERSON with cell phone DATA = $D(R, \theta)$
TEMPLATE = $T(R, \theta)$
CORR. COEFFICIENT $D = (D_1, D_2, D_3, D_4)$
$T = (T_1, T_2, T_3, T_4)$ $D_1 = D_1^I + i D_1^Q$
$D_2 = D_2^I + i D_2^Q$
$D_3 = D_3^I + i D_3^Q$
$D_4 = D_4^I + i D_4^Q$ $T_1 = T_1^I + i T_1^Q$
$T_2 = T_2^I + i T_2^Q$
$T_3 = T_3^I + i T_3^Q$
$T_4 = T_4^I + i T_4^Q$ $T_i^* = T_i^I - i T_i^Q$
$D_i^* = D_i^I - i D_i^Q$ $$CC(D,T) = \frac{T^* \cdot D}{|T^*| \times |D|} = \frac{i^\phi(T_1^* D_1 + T_2^* D_2 + T_3^* D_3 + T_4^* D_4)}{|T^*| |D|}$$

where $|T^*| = \sqrt{T^* \cdot T} = \sqrt{T_1^* T_1 + T_2^* T_2 + T_3^* T_3 + T_4^* T_4}$ and $|D| = \sqrt{D^* \cdot D} = \sqrt{D_1^* D_1 + D_2^* D_2 + D_3^* D_3 + D_4^* D_4}$ NOTE: $AA \cos(\phi_0 + \phi(t))$
$Q = AA \sin(\phi_0 + \phi(t))$
$I = AA \cos(\phi_0 + \phi(t))$
$I + jQ = AA \, e^{i(\phi_0 + \phi(t))}$ matched FILTER OUTPUT
$$mFO = \frac{CC^2}{1 - CC^2}$$

DESCRIBED IN "Neuromorphic parallel processor" U.S. PATENT 8,401,297

FIGURE 8

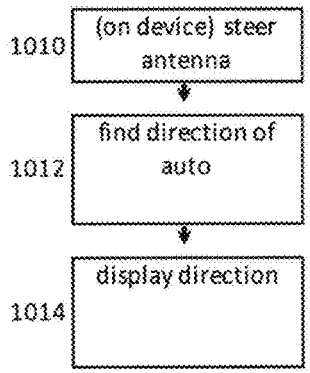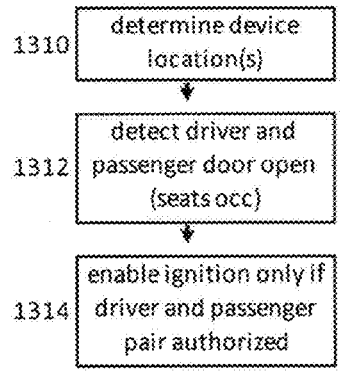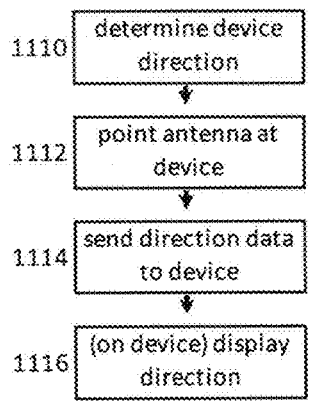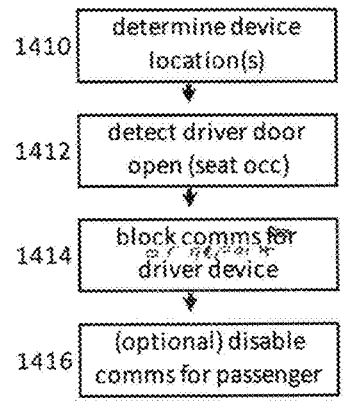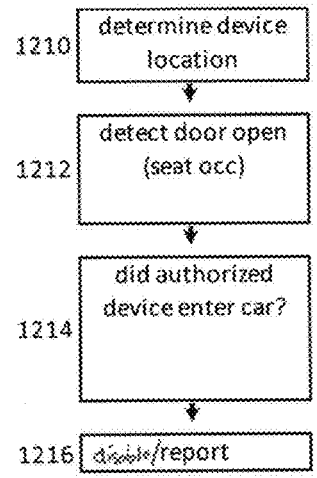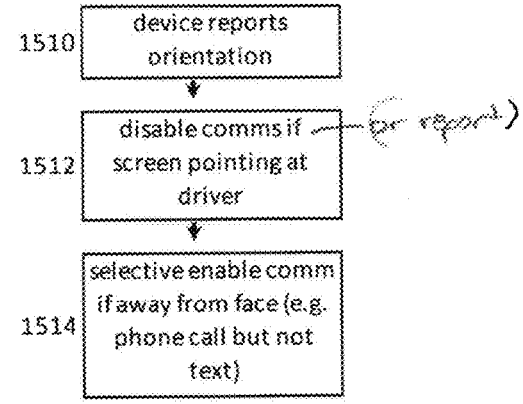

Figure 16 (per IV.D)
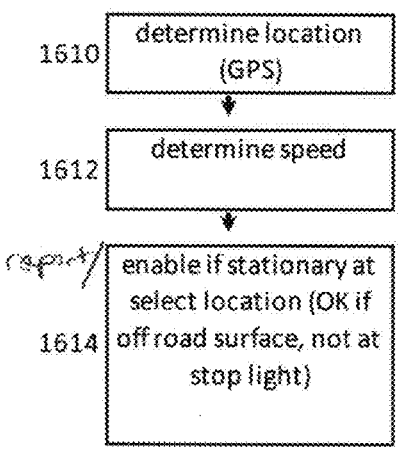
Figure 17 (per IV.E)
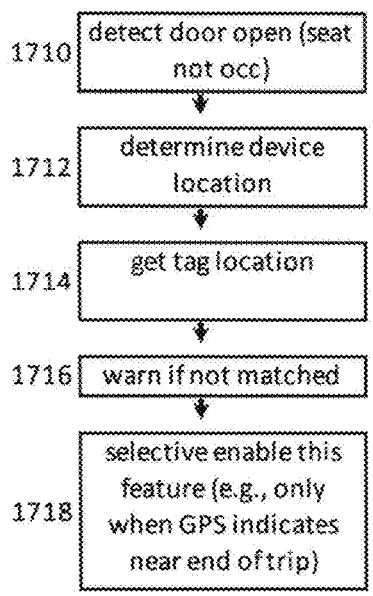
Figure 18 (per IV.F)
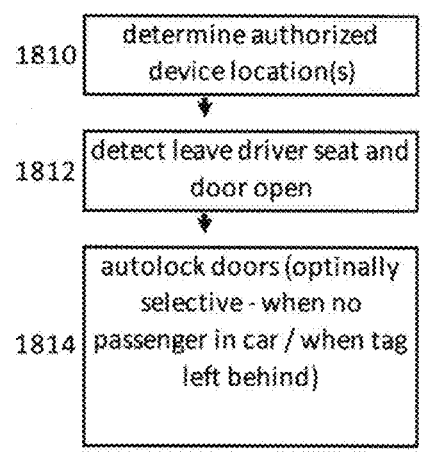
Figure 19 (per IV.G)
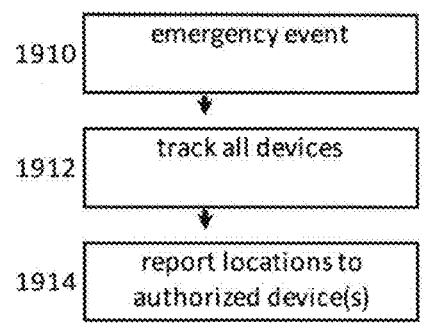

ORIENTATION INDEPENDENT ANTENNAS WITH DIRECTION FINDING FOR REMOTE KEYLESS ENTRY

RELATED APPLICATIONS

This patent application is a non-provisional application of, and claims the benefit of the filing dates of, U.S. Provisional Patent No. 62/645,477 filed on Mar. 20, 2018 entitled "Orientation Independent Antennas with Direction Finding for Remote Keyless Entry", the entire contents of which are incorporated herein by reference.

BACKGROUND

Technical Field

The present application is directed to an improved keyless entry system for a vehicle and other applications, including mobile devices, for which the underlying methods and systems may be utilized.

DESCRIPTION OF THE RELATED ART

Remote Keyless Entry (RKE) using a handheld transmitter first began appearing on the French made Renault Fuego in 1982, and as an option on several American Motors vehicles in 1983, including the Renault Alliance. The feature gained its first widespread availability in the U.S. on several General Motors vehicles in 1989. Traditional keyless remotes contain a short-range radio transmitter and operate at a frequency of 315 MHz for North American-made cars.

The functions of a remote keyless entry system are contained on a key fob (also called a "device" herein) or built into the ignition key handle itself. Buttons on the device are dedicated to locking or unlocking the doors and opening the trunk or tailgate. On some minivans, the power sliding doors can be opened/closed remotely. Some cars will also close any open windows and roof when remotely locking the car. Some remote keyless fobs also feature a red panic button which activates the car alarm as a standard feature. Further adding to the convenience, some cars' engines with remote keyless ignition systems can be started by the push of a button on the key fob (useful in cold weather), and convertible tops can be raised and lowered from outside the vehicle while it's parked.

Current keyless entry devices use a conventional antenna that is limited in range and usage. Single element monopole type elements are susceptible to the above listed effects including the scattering centers on the vehicle. The resulting antenna response may be fluctuating as a function of angle of arrival for signals of interest, especially in an urban environment on a moving vehicle.

Some have proposed fixed directional antennas mounted in the vehicle's external mirrors or roof for remote keyless entry. See for example U.S. Pat. Nos. 6,861,942 and 8,319,605.

As described in U.S. Pat. No. 9,013,360, and incorporated herein by reference, directional antennas provide an improved solution in other contexts such as satellite communications. That design allows a radio to communicate without knowing the orientation of the transmit and receive antennas in advance. The antenna described in that patent is formed from one or more three dimensional structures that supports sets of radiating elements. These elements are oriented in four different directions—preferably orthogonal. With this orthogonal design and specialized combining circuits, the antenna achieves omnidirectional, directional, and polarized operating modes across a wide frequency range.

Additionally, antennas that are orientation independent have been used in applications such as indoor positioning systems. See for example US Patent Publication No. 2018/0191079 entitled "Indoor positioning system utilizing beam-forming with orientation- and polarization-independent antennas" incorporated herein by reference.

SUMMARY OF PREFERRED EMBODIMENTS

Disclosed herein are a system and method for an improved RKE system, referred to herein as The Advanced RKE System ("TARKES"). Such a system and method employs a specialized antenna system ("AS") on the roof of a car (or other vehicle) that determines the direction and distance of nearby devices such as key fobs devices, smart phone devices enabled with Remote Key Entry (RKE) features, or even other Bluetooth/WiFi enabled devices more generally). In some arrangements, the specialized directional antenna system can replace the multiplicity of RKE antennas currently placed around the car today that perform the same remote entry functions.

In addition, the TARKES can even supplant existing functions or support other new functions which have not previously been possible. For example, the TARKES, via an internal data processor, or by cooperating with other data processors, can now inform control electronics in the car, such as a Telematic Control Unit (TCU) of the device location data provided by the specialized antenna system. That location information can now be used to determine whether a particular identifiable device was nearby to or in the car at certain times, such as when driving, or under other operating states of the car. In some embodiments, the antenna system and method is also able to ascertain the position within the car of the device(s) to provide further new functions.

For example, information about the location of the device can also be combined with information available from other sub-systems within the car to then make other decisions. For example, door open/close state, seat occupied state, car motion/acceleration, and GPS location available to, for example the TCU can be combined with the device location information from the TARKES. Such functions may include simple features such as displaying the location of the device in the vehicle or of the vehicle on the device. However more advanced features such as controlling operation of the car depending upon whether an authorized driver or combination of driver and occupants are in the car, or controlling operation of a mobile device depending upon whether the driver is improperly occupied with a mobile device screen when the car is in motion, or reporting when valuable objects (such as a purse) having an electronic tag have been left unattended in the vehicle, or selective activation of automatic door locks, or enabling special informational modes in emergency response situations.

In addition, the device itself may use a directional antenna and possibly an electronic compass or time-of-flight (TOF) or receive signal strength indicator (RSSI) circuit for still other functions. Such a directional antenna is able to produce a stronger signal to the vehicle when aimed at the car and thus establish a connection from a greater distance than traditional devices. However, device may also use such a directional antenna and or electronic compass to ascertain the direction that a car may be located relative to the device. The TOF or RSSI detected by the device, combined with a companion circuit in the car's system, may be used to help the system ascertain the distance between the device and car. Alternatively, two separated directional antennas could be used to determine approximate distance such as by determining an intersection of the two directional vectors produced by the separated directional antennas. Other techniques for determining bearing such as those that use phase can also be used.

BRIEF DESCRIPTION OF FIGURES

FIG. 1B is a block diagram of the system components.

FIG. 8 is another way to obtain location of the key device.

FIG. 10 is a logical flow diagram showing how the key device may display the direction of the vehicle.

FIG. 11 is a logical flow showing how the vehicle can now determine object direction and send direction information to the object.

FIG. 12 is a logical flow showing a how the device location and data indicating an event such as a door open or seat occupied can now be used to determine if an authorized driver entered the car.

FIG. 13 is a flow showing a use case where the device location can be combined with passenger and driver door open and/or seat occupied information enabling the ignition only if the driver and passenger are an authorized pair of users of the vehicle.

FIG. 14 is a flow illustrating how the device location and the driver door open/seat occupied event can be used to can to enable or disable communications by the device.

FIG. 15 is another functional flow where the device may report its orientation and the system and/or method can disable device communication if it detects the screen is aiming at the drivers face and/or enable communication if the device otherwise not facing the driver.

FIG. 16 is a flow chart illustrating how vehicle location and speed can be used to selectively enable functions depending on exactly where the vehicle is located, such as off the road surface or at a stoplight.

FIG. 17 is flow where the system also interacts with a tag location system and combines door open or seat occupied events with device location information to send a warning if a tag device has been left behind in the vehicle or when the vehicle is nearing the end of a planned trip.

FIG. 18 is a logical flow showing how authorized devices are located and door locks are only selectively locked such as when no passengers in the car or when a tagged device has been left behind.

FIG. 19 illustrates a logical flow occurring when an emergency event occurs such as might be triggered by an emergency responder in which case all devices in a surrounding area may be tracked and reported.

DETAILED DESCRIPTION OF PREFERRED EMBODIMENTS

Introduction

The BKE systems, methods and apparatus described herein utilize at a minimum a four (4) port antenna to provide coverage outside the vehicle, outputting amplitude and phase information that are then used in developing range and bearing information. The antenna array may preferably be an orientation independent array that provides hemispherical coverage. An additional hemispherical antenna can be implemented internal to the vehicle to obtain location information from the interior space. Distance (range) may be established with element-to-element phase data. Angle may also be determined from detected amplitude and phase. The angle and range information can also be applied with an algorithm which utilizes a calibration template or library of the characteristics to correlate against. The antenna architecture can provide a combination of directional, spatial and polarization diversity which is well suited for the non-uniform environment, which is typically rich in scattering centers and multipath effects as found on a car.

In a preferred embodiment, the systems, apparatus and methods identify linked Bluetooth devices (such as a specific phone, key fob, etc) approaching or leaving the vehicle. Distance and angle data (i.e. the location) of any linked devices approaching or leaving the vehicle, may be generated at required rates, for example, when linked devices enter or leave the vehicle, or precise location information may be generated for linked Bluetooth devices within the vehicle.

Figure 1A:
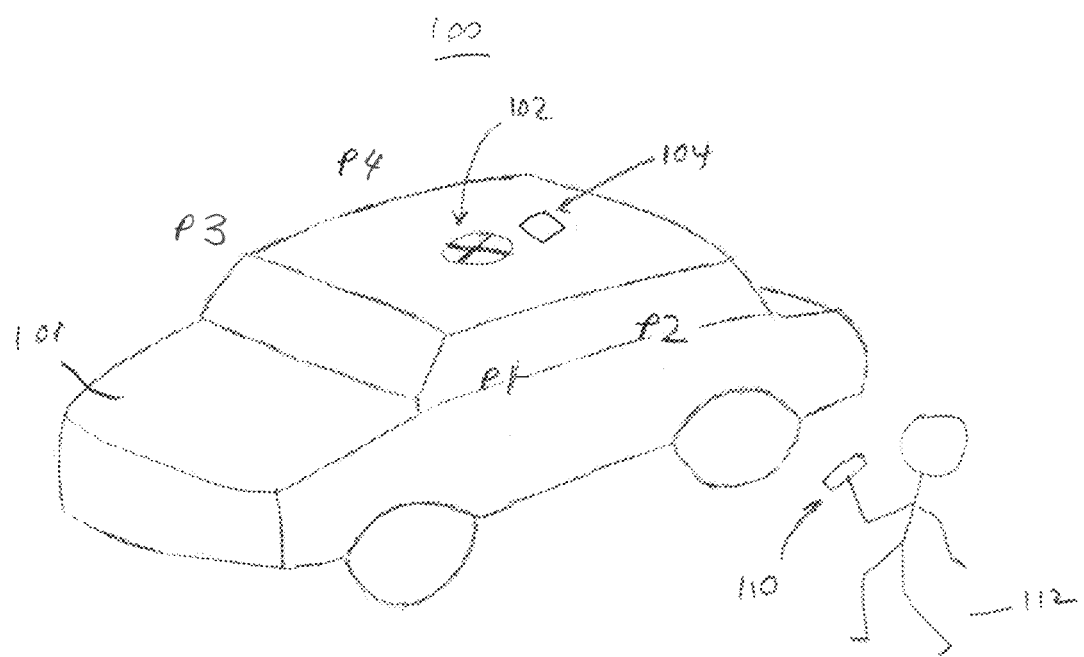
FIG. 1A is a drawing of an example use of the RKE system.

FIG. 1A shows an example of a passive entry and/or passive start system 100 that is capable of detecting a remote control "object" acting as a key (e.g. key fob or a smartphone). Here a vehicle such as a passenger car 101 contains an antenna array 102, and position finding processor and/or electronics 104 to determine the relative location of an object 110 such as a remote key device 110 and thus the location of a person 112 associated with the device 110. The object 110 may be a fob, or a smartphone that uses a wireless protocol such as Bluetooth Low Energy (BLE) to communicate with electronics in the vehicle 101. It should be understood that other wireless protocols and other dedicated electromagnetic spectrum such as WiFi (IEEE 802.11), infrared, etc. may also be used to establish communication link(s) between the device 110 and the vehicle 101. In the case of the infrared protocols, an IR detector can be applied.

FIG. 1B shows an example antenna array 102 and position finding processor 104 in more detail. The antenna array 104 may consist of a number of radiating elements 101-1 103-1, 103- . . . , 103-n. As will be understood shortly, the number of radiating elements is preferably four or eight. Each element feeds a combining circuit 111 that combines received and/or transmitted energy feeding a BLE controller 130. The BLE controller 130 may be a standard Bluetooth Low Energy chip or module that may typically be integrated with other electronics in the vehicle 101 (such as integrated with TCU 120).

The antenna elements 103 also feed down conversion circuitry such as a corresponding RF to IF down converter 105 and analog-to-digital converter (ADC) 107. Although not shown in detail, additional filters and beamforming circuits 117 may also be provided. It should also be understood that although a down converter 105 and ADC 107 are shown for each element, a commutator and single time-multiplexed radio receiver may be provided to process the array outputs, provided that it can be switched fast enough so that each digital output is properly sampled.

The baseband digital signals are then provided to a location processor 109 which may comprise a field programmable gate array, stored program microcontroller, dedicated logic, or application specific integrated circuit. Location processor 109 determines location of a received signal using one or more techniques. These may include determining an angle of arrival using interferometry or other more advanced techniques, and determining distance using Received Signal Strength Indication (RSSI) or time-of-flight (TOF) or other more advanced techniques. Thus processor 109 may perform other algorithms enabled by the use of specialized antenna array geometries to determine the range R and arrival angle.

As shown in FIG. 1B, the combiner 111 also provides an optional path that allows the TCU (BLE controller) to transmit RF signals out of the same antenna array 103.

A number of use cases for the TARKES are described below in connection with FIGS. 10-19. The TCU 120, cooperating with the location information provided by the location processor 109, executes the logic for performing these use cases (such as for example, only unlocking the door(s) for a device that has been previously paired, or detecting when a specific person, such as teenage son, has approached the car, but then disabling the ignition if their friend is instead sitting in the driver's seat.

"Channel Data" that the BLE Controller 130 detects is used to identify one or more specific transmitter device(s) that have been paired. This may be, for example, a Bluetooth address (e.g., the device-specific 12 digit hexadecimal number that unique identifies each Bluetooth device (e.g., a BD_ADDR as specified by IEEE802.15.1)). The channel data may be shared with the TCU 120 and/or location processor 109 in some embodiments.

The location controller 109 is typically operated to return location data for only those signals that BLE controller 130 enables it to process. In most cases this would be only the location data for paired devices. However, the BLE controller can query for location information even for devices which have not yet been paired.

Location processor 109 is therefore slaved or otherwise time synchronized to the BLE controller 130 (in other words, it is synchronized to the hop rate of the paired Bluetooth device and operate on that waveform(s), with its clock slaved to the BLE controller 130. Thus the location data provided by location processor 109 is produced in synchronism with the demodulate Bluetooth signal data, as produced by the radio(s) within the BLE controller 130.

Position information along with other Bluetooth data such as the Bluetooth data payload are in turn provided by the BLE controller to other electronics and systems in the vehicle. For example, these other electronics may include a Telematics Control Unit (TCU) 120 that interfaces with and/or controls other vehicle subsystems. These vehicle subsystems may include an Electronics Control Unit (ECU), On Board Diagnostics (e.g., OBD-II), GPS navigation systems, central door locking systems, in-vehicle displays, status sensors such as a seat occupied sensor and/or accelerometers. The TCU 120 may also interface and/or control other wireless devices such as Wi-Fi transceiver and or radios connected to public communication networks such as a 4G or 5G mobile network.

Figure 1C:
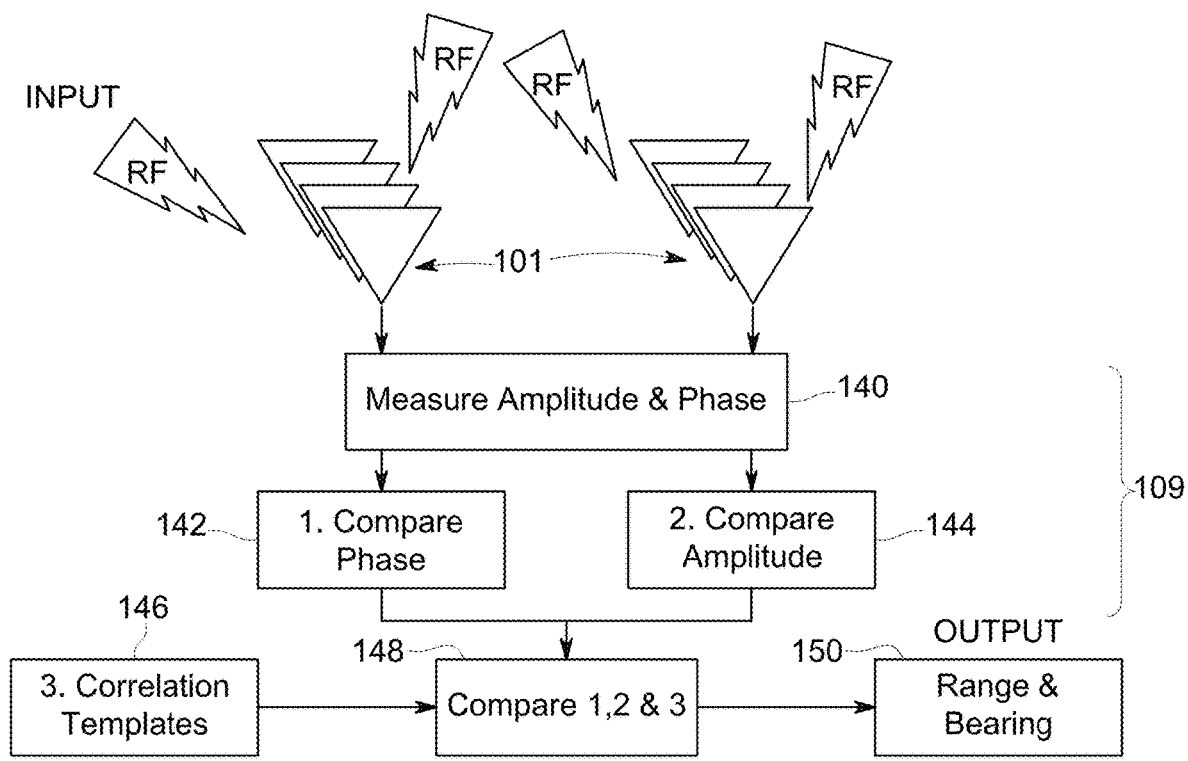
FIG. 1C is a high-level diagram of one approach to determining location of a device such as a key fob or smartphone.

FIG. 1C is a high-level functional diagram of one example of a process implemented by the location processor 109. Down-converted and digitized signals from the antenna elements 101 are first subjected to amplitude and phase measurements 140. Phase comparisons 142 and amplitude comparisons 144 are then performed. The results of the measurements 140 and comparisons 142, 144 are then compared to provide a range and bearing output 150. The comparison 148 also uses correlation templates 146. The templates 146 are typically generated for each vehicle type, with a template for each of the selected set of ranges and bearings within the desired operating range. The templates can be generated empirically from data collected on a vehicle or by using EM simulations. More details of this process are explained below. It should be understood that other approaches to determining location are possible.

Typically the system 100 should be capable of determining the position of the object (device) 110 (or vice versa) within a range of about 30 meters of vehicle 101. Relative angle of arrival and range are preferably determined as the object 110 approaches the vehicle, ultimately arriving at different locations of interest, such as positions P1, P2, P3, or P4 near the vehicle doors (FIG. 1A). For some embodiments, it is desirable for entry into the vehicle to be detected, including the location of the object 110 outside the vehicle, and in some instances, even the object's position when it is inside the vehicle.

As will be explained in more detail below, the range of the object may be determined, in some embodiments, with time difference of arrival using a cooperative protocol that has the BLE controller 130 transmit signals to the object 110 to place the object in a transponder mode. RSSI outputs or triangulation using two or more separate elements offer other ways of determining range.

I. Antenna Assembly Design

Traditional RKE systems are generally comprised of a ring of antennas located at least on the driver, passenger, and rear of the vehicle and also a plurality of antennas located in the interior of the vehicle to achieve a large baseline. As a replacement to this ring of antennas, in preferred embodiments the vehicle is instead outfitted with an antenna array comprised of one or more directional elements. In some embodiments, the array is located on the roof of the vehicle and the included directional antennas are preferably conformal with the roof. In some embodiments, a second portion of the antenna array may reside within the vehicle's interior, preferably up high—against the roof or visor area of the vehicle interior, near the sunroof in a position that does not affect the sunroof's functionality, integrated into the vehicle dome lighting or interior lighting, or be affixed to the windshield near the rear-view mirror.

Figure 2A:
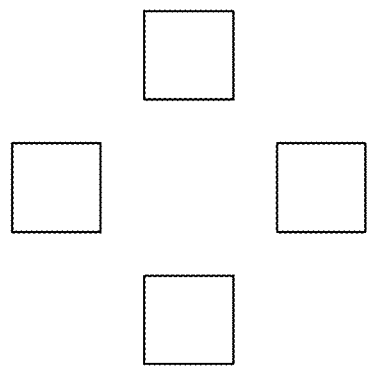
FIGS. 2A, 2B, 2C and 2D are example embodiments of a directional antenna used in the vehicle.

FIG. 2A is an example of an antenna array 102 that may be used. It consists of four (4) independent radiating elements preferably located on orthogonal axes. The elements may be patch radiators or other elements conformal to the vehicle roof (e.g., planar).

An orientation independent antenna array (OMAN) and associated beam forming and processing circuits 104 provide polarization independent position information for the object 110. One example of such an antenna array 300 is shown in FIG. 2B and was described in the co-pending U.S.

Patent Publication 2018/0191079 as well as U.S. Patent Publication 2018/0287671, incorporated by reference, in more detail. It consists of four (4) orthogonal radiating elements 302 (A, B, C, D) disposed over a reference plane 304.

The orthogonal array of FIG. 2A or the OMAN array of FIG. 2B may be used with the circuits and processing shown in FIGS. 4, 5, 6 and 7 below to determine angle of arrival of a received signal. If a single array of FIG. 2A or 2B is used, then RSSI or TOF or triangulation processing is also needed to determine distance. If two arrays are used, other approaches, such as interferometry, may be used to determine distance.

Figure 2C:
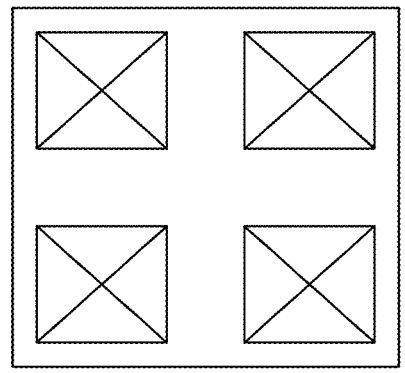

FIG. 2C is yet another example of an antenna array that can be used, a four-component array called CALPRO, one example of which is described in co-pending US Patent Publication 2018/0191072 entitled "Low profile antenna— conformal" hereby incorporated by reference. A single such CALPRO array structure can be used with the processing described in connection with FIG. 8 to both determine angle and distance.

Figure 2D:
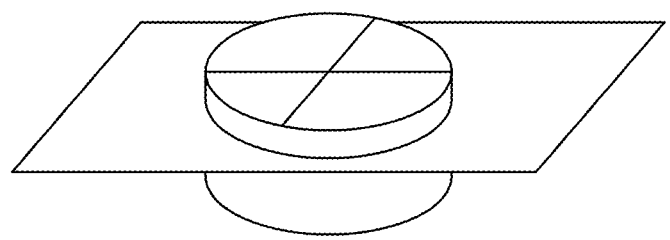
Figure 2B:
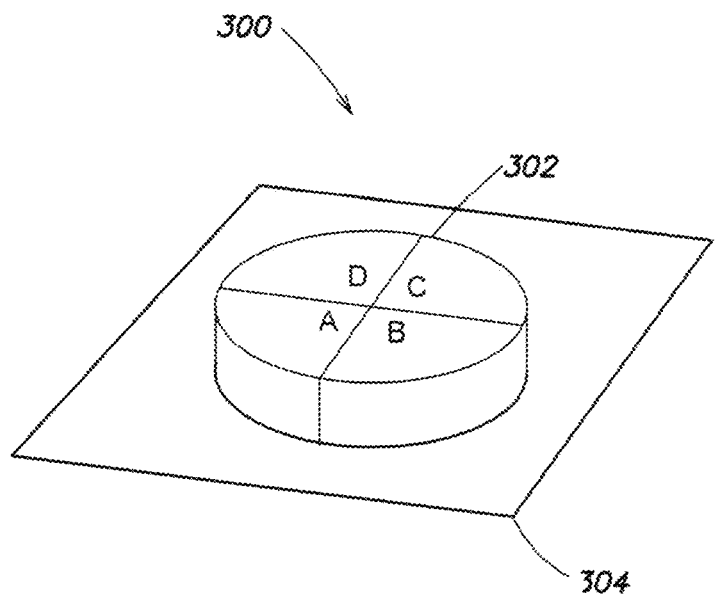

As shown in FIG. 2D, one implementation uses two (2) mirror image antenna arrays, one for outside the vehicle, and the other inside the vehicle, for a total of eight (8) independent antenna elements. The outside antenna is conformal to the roof while the indoor antenna protrudes into the cabin. The antennas can be used independently to provide two (2) hemispheres or as a single antenna to provide a full sphere. As the object approaches the vehicle, the electromagnetic waves are diffracted up to the plane of the roof and intercepted by the antenna. There may be a small error in the location of the object. This error can be minimized by measuring the antenna response for a number of people of varying heights and weights. Different models may require specific calibration. As explained below, templates or library of characteristics used as a database for the object to be correlated against, or an algorithm with the known properties is created real-time.

The apparatus, systems, and methods provide an improved remote keyless entry (RKE) system using an improved conformal, omnidirectional antenna built into the vehicle. In preferred embodiments, the antenna uses four (4) or eight (8) independent directional elements. This combination of directional, spatial, and polarization diversity is especially well suited for non-uniform environments, rich in scattering centers and multipath effects. In some embodiments, the vehicle antenna assembly utilizes Orientation-Independent Antennas (ORIAN) in order to reduce its size.

The exterior and interior antenna can be combined into one assembly that could be inserted through a hole in the roof with one antenna facing the interior and the other sending and receiving to the outside of the vehicle. The top antenna could be conformal, and flush with the surface of the roof of the car. The interior antenna may be hidden in the headliner of the car. In other implementations, the two antenna arrays can be separated, with the exterior antenna, for instance located behind the sun roof, and the interior antenna mounted up by the visors.

In another embodiment, the antenna inside the car could receive and send signals out the windows of the car, thus performing the functions otherwise done by the antenna on the roof.

A single-array antenna system might suffer from signal attenuation, blockage, and shielding from the pillars of the roof of the vehicle. The signals, however, might be adequate when the person holding the device is beside the car, such location being the most critical to the functioning of the RKE system.

Furthermore, the scattering and attenuation might could be characterized ahead of time, with such information being used to calibrate or adjust the data received later to compensate for such signal interference.

Determining Angle of Arrival

As explained above, the antennas are coupled to beamforming 117 and location controller 109 to perform direction finding (DF). With such DF capability, the system can now "watch" as a person approaches the car with a device and know to which part of the car the person is approaching. To instigate other RKE functions, however, the TARKES also needs to know the person's (that is, the device's), distance to the car. There are several different techniques that may be employed to ascertain distance at the same time direction was determined.

Figure 3:
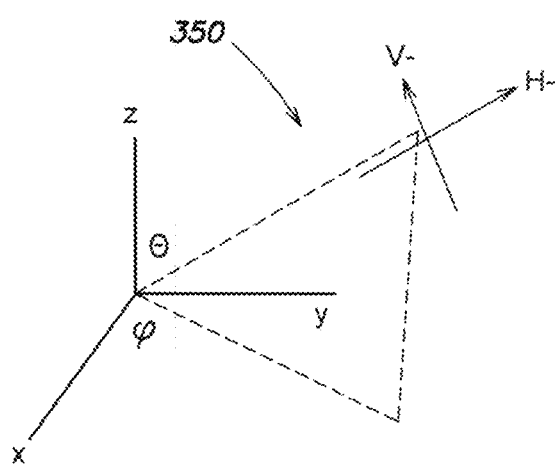
FIG. 3 is a set of reference axes in 3D space.

One approach is described in the above-referenced U.S. Patent Publication 2018/0191079 as well as U.S. Patent Publication 2018/0287671, each of which are hereby incorporated by reference. As explained in that patent publication and shown in FIG. 3 here, X, Y, Z axes relative to an example antenna 300 represent the surrounding three dimensional space. A ground plane 304 is parallel to the X-Y plane. (Although antenna 300 is shown in FIG. 3 as a simple dipole, references to antenna 300 are meant herein to reference any of the 4- or 8-element arrays of FIG. 2A, 2B or 2D. A signal of interest 350 may radiate to antenna 300 from a direction defined by an azimuth angle phi ($\varphi$) and elevation angle theta ($\theta$). The signal of interest may have both horizontal (H-) and vertical (V-) polarization components, but the antenna array 300 and corresponding beamforming components exhibit orientation independent operation with both horizontal (H-) and vertical (V-) polarizations present in a signal of interest.

Figure 4:
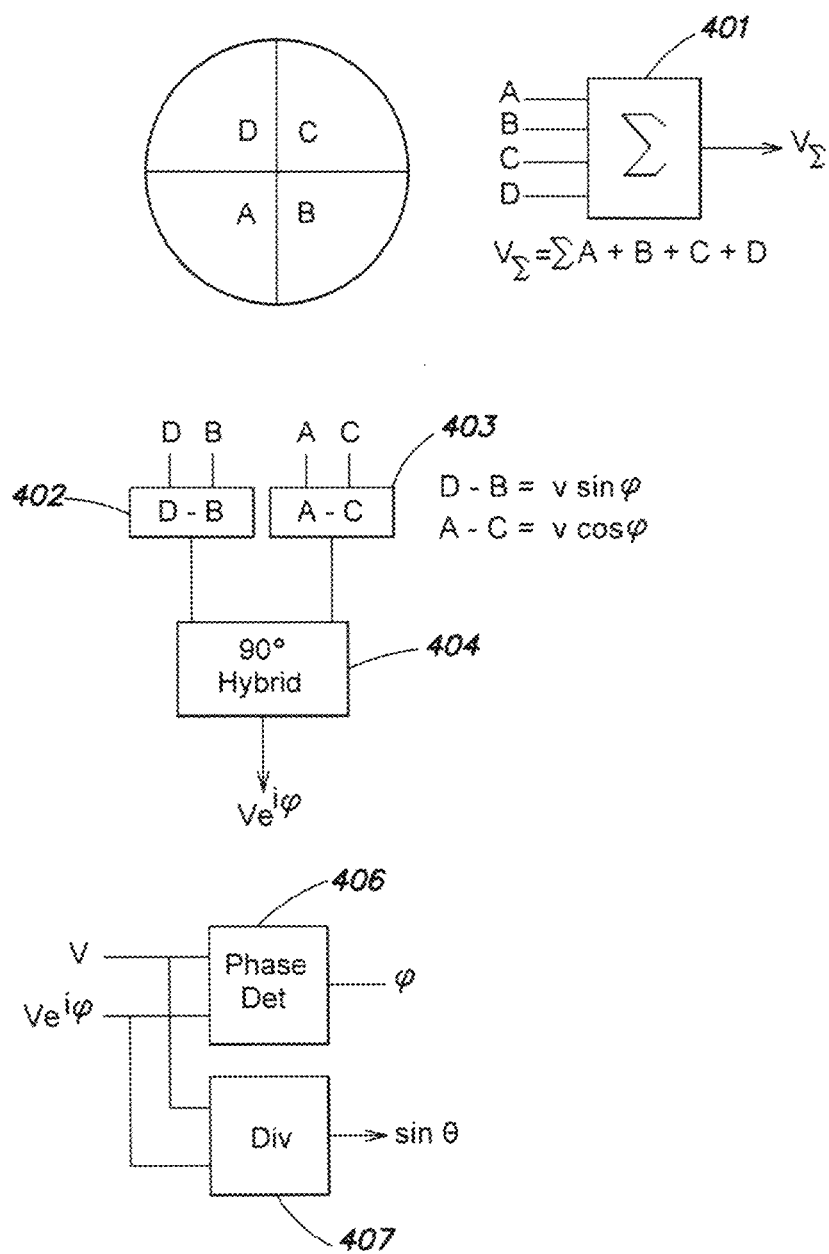
FIG. 4 is an example beamforming circuit to provide angle of the key device.

FIG. 4 illustrates an example Radio Frequency (RF) beamforming circuit 117 that can be used with electronics 104 to produce an orientation independent response from antenna array 300 that determines both the azimuth and elevation angles. In this arrangement, a first hybrid combiner 401 produces a signal $V_\Sigma$ representing the sum of signals at the four elements A, B, C, D and, with the suppression of the horizontal component, represents only (or mostly) the vertical component.

A second hybrid power combiner 402, which is a difference, or 180° combiner provides an output signal $$D-B=v\,\sin(\varphi)$$

and a third 180° hybrid 403 provides $$A-C=v\,\cos(\varphi)$$

The outputs of combiners 402, 403 feed a 90° quadrature hybrid 404 to produce a signal, $$V=ve^{j\varphi}$$

proportional to the azimuthal angle.

A phase detector 406 can determine a phase difference 406 between signals $V_\Sigma$ and V thus provides the azimuthal angle, $\varphi$. A hybrid divider 407 determines the ratio between them, to produce an output proportional to the elevation angle $\theta$.

Figure 5:
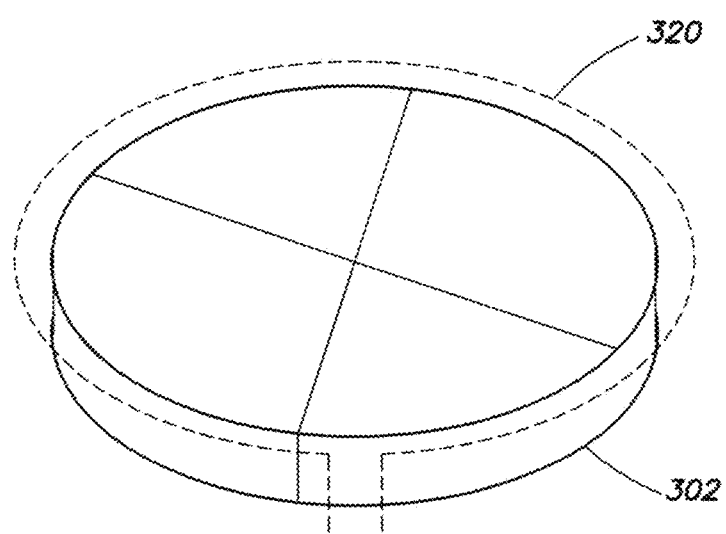
FIG. 5 is an alternate arrangement for an orientation-independent antenna.
Figure 6:
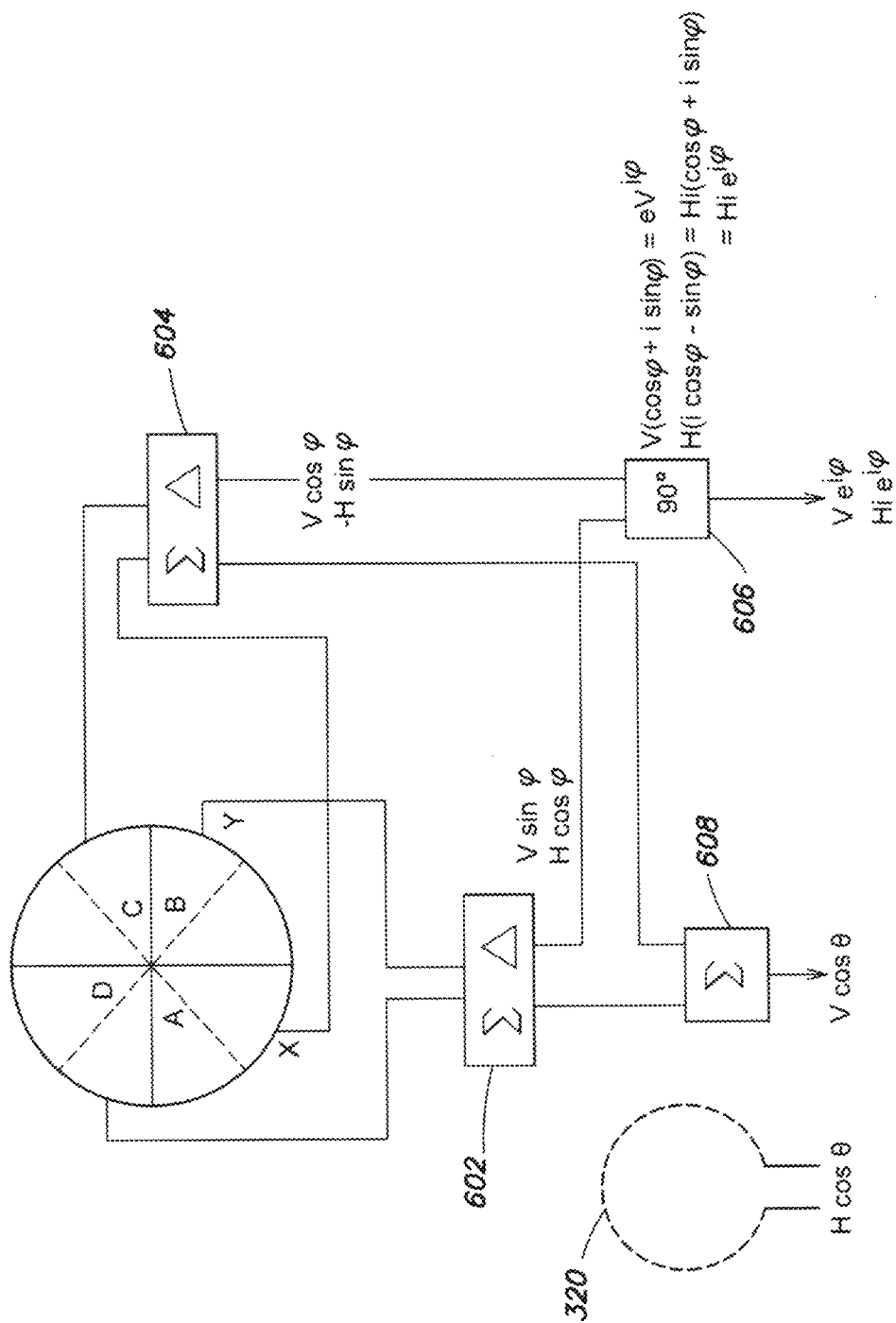
FIG. 6 is a beamformer used with the orientation-independent antenna of FIG. 5.

Another implementation shown in FIG. 5 can be used where both horizontal and vertical polarization are present. A circular wire loop 320 is disposed above the cylindrical element 300. As shown in FIG. 6, the output of the wire loop 320 can be combined with other signals to produce a signal proportional to the horizontal component $$H \cos \theta$$

Hybrid combiners 602, 604 are 180° combiners that provide both a sum and difference output. The 180° hybrid combiners 602, 604, quadrature combiner 606, and combiner 608, arranged as shown, produce signals:

$$V \cos \theta$$

$$V \sin \varphi$$

$$H \cos \varphi$$

$$H \sin \varphi$$

$$V e^{i\varphi}$$

and $$H e^{i\varphi}$$

Figure 7:
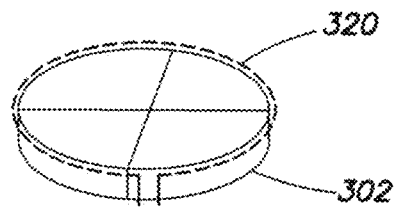
FIG. 7 shows additional steps to obtain azimuth and elevation.

As shown in the equations of FIG. 7, the resulting signals from the hybrid combiners can be further processed to obtain signals representative of both the azimuth and elevation that are independent of any horizontal component and vertical component.

For example, Analog-to-Digital Converter(s) (ADCs) 107 may process the outputs of the hybrid combiners and be fed to the location processor 109 which then performs one or more of the method steps of FIGS. 6 and 7, thus obtaining angle information in the form of an azimuth and/or elevation.

II. Tracking Methods

A. Keyless Automobile Entry Phenomenology Utilizing Interferometric Correlation

The ability to locate and track an object such as a cell phone or key FOB over a range of 1 to 30 meters from the vehicle would normally require an electromagnetic triangulation baseline of a least 3 meters. This requirement would result in an expensive antenna array over much of the vehicle. Time of flight (TOF) systems thus typically require large bandwidths not normally available.

In the embodiments described herein, however, the vehicle instead employs a small 4 or 8 four element conformal structure on the roof, which may be as small as 5 inches by 5 inches. This results in the use of the entire vehicle as a collecting aperture. See for example, the so-called CALPRO array described in the co-pending U.S. Patent Publication 2018/0191072 already mentioned above. The CALPRO array thus provides a sufficiently large baseline to meet the above tracking requirements. As the wavefronts from the transmitting object (key FOB or cell phone) interact with the vehicle, currents are generated over whole vehicle, which are collected by the CALPRO array. There is a unique set of currents created on the vehicle for each location of the key fob and/or cellphone, thus enabling a set of matched filters to be created for each position.

A four (4) element CALPRO array can provide eight (8) independent parameters involving phase and amplitude. From each element, a set of M different frequencies may be used for each measurement, thus increasing the parameter count to 8 times M. The matched filters, explained in more detail below, used in some embodiments also allow for operation in highly cluttered environments e.g. parking garages. Channel state information between the cell phone and the vehicle are used to equalize the path, thus maintaining the accuracy of location. Since the polarization of the key FOB or cell phone is quasi random, two sets of matched filters may be needed, with one set using horizontal polarization and the other set, vertical. If multiple matched filter outputs for H and V are obtained, they may be combined, averaged, or fused using the algorithm(s) described in "Neuromorphic parallel processor", U.S. Pat. No. 8,401,297 and incorporated fully herein by reference.

One algorithm to implement interferometric correlation using a four (4) element CALPRO antenna is shown in FIG. 8. As was shown in FIG. 1B, signals received at the four elements (1, 2, 3, 4) are first quadrature demodulated to a lower frequency (such as baseband or a lower intermediate frequency) to utilize inexpensive analog to digital converters. The digital data, D, received from the four elements is presented to the distance processor 109 as complex valued vectors, D1, D2, D3, D4, with each vector composed of in-phase "I" and quadrature "Q" channel components. The vectors are treated as complex numbers, e.g., $$D_1 = D_1^I + i D_1^Q$$

$$D_2 = D_2^I + i D_2^Q$$

$$D_3 = D_3^I + i D_3^Q$$

$$D_4 = D_4^I + i D_4^Q$$

Also provided to the distance processor 109 is matched filter template data, T, as corresponding four vector values T1, T2, T3, T4. The template data was previously created for a range of distances and angles in the domain surrounding the vehicle. Thus, during this prior templating process, a Bluetooth enabled object was placed in each one of a set of K known locations surrounding the vehicle, and the resulting output of the antenna elements was stored as complex vectors $$T_1 = T_1^I + i T_1^Q$$

$$T_2 = T_2^I + i T_2^Q$$

$$T_3 = T_3^I + i T_3^Q$$

$$T_4 = T_4^I + i T_4^Q$$

with a set of vectors ($T_1$, $T_2$, $T_3$, $T_4$) stored for each angle and distance.

To determine an angle of arrival and distance, as a Bluetooth enabled transmitter (e.g., a cellphone or key fob) approaches the vehicle, the resulting data vectors D produced from the four elements are stored and compared against the data base of K stored templates T. The comparison used by the processor 109 can involve determining a correlation coefficient value (CC) as $$CC(D,T) = (T^* \cdot D) / (|T^*| \times |D|)$$

where "|" is absolute value, "*" represents the conjugate, "·" represents the vector dot product and "x" represents the vector cross product. |T*| and |D| can be determined from the square root expansions shown on the left hand side of FIG. 8.

The resulting matched filter output (MFO) for each template is then determined as $$MFO = CC^2 (1 - CC^2)$$

The location of the template T that produces the largest magnitude MFO output is then selected by the distance processor 109 to be the location of origin of the data signal, D.

Figure 9:
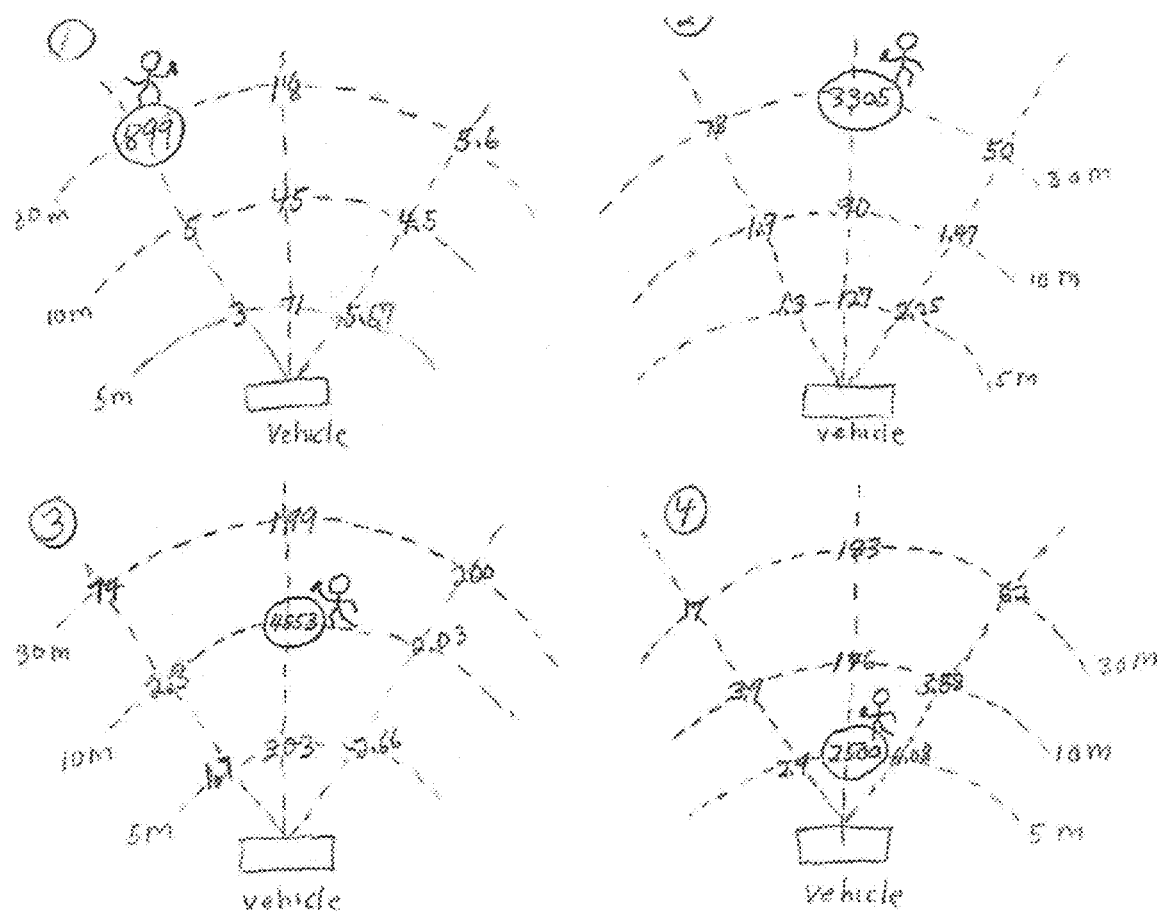
FIG. 9 illustrates how a moving key device can be located.

Using this approach, it is thus possible to create a track of the location of the object as it moves towards or around the vehicle over time. FIG. 9 shows the result of a test of this feature. The test system used at CALPRO antenna mounted on the roof of a mid-sized car, and was conducted outdoors with a person having a key fob radiator and moving about in a 3-acre field. Matched filter templates T were generated for 9 positions in the geometry surrounding the vehicle as shown in FIG. 9. Following the peak values in the result in MFO outputs shows the person with the key fob radiator starting at a point 30 meters away on the left leg, crossing over to the middle leg, and then eventually proceeding to the vehicle.

Elimination of Multipath Effects

The outputs from a set of match filters can thus provide a two-dimensional track plot of the location of the device (cell phone/key fob) over time. Often, however, in urban environments there are many other nearby vehicles, buildings, and other metallic objects located in the immediate area. These metal objects serve as RF reflectors, and thus become secondary scattering centers of the energy transmitted by the remote device.

It can be appreciated then that in addition to showing the location of the object being tracked, the two-dimensional track plots output by the matched filter templates will also the show where the scattering centers are located at each point in time.

That is, the two-dimensional track plot will show, in addition to a peak where the remote device is located, secondary smaller peaks where the scattering centers are located. Thus, further discrimination of the remote device against this relatively stationary scattering centers is possible. Note for example that the remote device location is the only energy source that moves. Therefore, subtraction of sequential-in-time match filter outputs will tend to cancel out the scattering sources, since those sources do not move. A two-dimensional peak plotting algorithm then shows the path of the remote device as it moves from place to place.

B. RSSI Distance Determination

A second, perhaps somewhat simpler, but less accurate method for determining distance, can involve detecting signal strength, commonly called "RSSI". Any of the antennas of FIG. 2A, 2B, 2C or 2C may be used with this approach. Here the distance processor 109 determines a signal strength of the signal received from the device, and that signal strength is taken as representative of distance. The RSSI algorithm may also take into account the location of the antenna on the roof and the distance to the edge of the car at each angle when translating such RSSI-determined distance from the antenna into a "distance-from-the-car". Furthermore, the antenna can be pre-calibrated to determine what attenuation effects the shape of the car itself would have on the device's signals that flowed over the car. With such attenuation information stored in a look-up table and associated with each angle relative to the antenna, the distance processor 109 may make a more accurate determination of distance-to-the-car.

C. Stereoscopic

A third method of determining distance could be employed as long as the antenna array 102 employs three or more directional antennas that have a minimum spacing between them. Comparing signals received from such a multiplicity of antennas provides the receiver with "stereoscopic vision". That is, angle-to-the-device information from two or more directional antennas can be determined in two or more dimensions (azimuth and/or both azimuth and elevation). By comparing the angles and determining where such vectors associated with the angles-to-the-device intersected, distance to the antenna can be determined—that is, the intersection point of the two or more "angle-to-the-device" vectors are compared to indicate the location of the transmitter, in much the same way as a well-known radio direction finder.

D. Time of Flight

A fourth method to determine distance can involve using a time-of-flight circuit (TOF) in both the remote key device and the vehicle antenna. Such TOF circuits can periodically transmit RF ranging signals; the time it takes for such an RF signal to travel between the device and the antenna can then be translated into a distance. Such an approach might be the most accurate under many circumstances, however, it involves placing such a circuit inside devices for which the antenna vendor might have no control.

It should be noted that more one distance-measuring method could be employed at one time with their results combined to achieve a more accurate result.

Inside the car, a similar antenna array might also be used to determine the location, or angle, of one or more devices located in within the car. Given that the devices are known to be in the car, distance to the antenna may not be as important. However, if accurate distance information was needed, and thus a more accurate location within the vehicle needed, then one or more of the distance measuring methods described above could be used. Note that the stereoscopic method's accuracy increases as the distance being measured decreases relative to the separation of the multiple directional antennas, thus making it more useful when determining distance within the car.

Determining simply whether the device is inside or outside the car is facilitated by the fact that RF energy being emitted inside the vehicle has a hard time making its way up to the top of the car. Thus, by comparing signal strengths received by the interior and external antennas it would be clear with relative precision when the device went from inside the vehicle to outside or vice versa.

III. Design Considerations and Use Cases

A. Device has its Own Directional Antenna

The remote device could be equipped with its own directional antenna. Such an antenna would allow the device to send stronger signals in a given direction allowing the device to establish a link with the car's antenna from a greater distance. Such a link might require the device to aim its directional antenna at various angles in order to establish such a link. Some examples of direction antennas particularly adapted for mobile phones are shown in co-pending U.S. Pat. No. 10,135,122 entitled "Super directive array of volumetric antenna elements for wireless device applications" which is hereby incorporated by reference in its entirety.

B. Car Finding with Device Directional Antenna

Sometimes when a car is parked and the owner comes back later to it, the location of the car may be forgotten. This problem can be solved by various apps on phones, however, to use the apps requires the phone to be pulled out, turned on, the app located, and then operated. It would be much more convenient if the device itself could indicate where the car was parked.

The remote device could be used to determine the location of a vehicle in several ways. In one approach as shown in FIG. 10, the device is equipped with a directional antenna and sends multiple transmittals (step 1010) in different directions until it establishes a connection with the vehicle' external antenna. The angle with the strongest link is then presumed to be the direction of the car (step 1012). This angle would be communicated to the user (step 1014) such as via lights on the device, via sounds, via a small display, by voice, or some other interface accessible to the device. Such guidance could made continuously or intermittently as the user approached the vehicle.

C. Car Finding with Device and Antenna Compass

In another embodiment, the vehicle's external antenna would be equipped with a compass, presumably the one associated with the car's GPS system, and the device would also have a compass. As shown in FIG. 11, one process may start with the TARKES linking with the device and using its directional antenna to ascertain the angle pointing toward the device location (step 1110). This direction would be expressed in terms of compass directions (northwest, south, etc.) and used to direct the car antenna (step 1112) and communicate the angle information to the device (step 1114). If the antenna said that the device was due south of the car, for instance, then the device would know that the car was due north of it. Using the interface means described above, the device could then direct the user back to the car such as via information on a display (step 1116).

D. Car Finding Using TOF

In another embodiment, either of the methods described above (device plus directional antenna or compass) could be supplemented with information regarding the distance to the car. If both the antenna and device were equipped with TOF circuits as explained above, the distance between the two could ascertained once a link was established. This information could be added to the interfaces described above. That is, lights, sounds, voice, display information, etc. could be used to indicate the distance to the car. A device display could even show a crude map showing the location of the car and point out how to get to it. Information regarding how rapidly the person was approaching the car (either via measurements or using standard walking times) could be used to indicate how long it would take to get there.

IV. Alternative Embodiments

A. Improving OBD-II Capabilities

There are many devices on the market today that connect to the OBD-II (On-board diagnostics II) port located beneath the steering wheels of vehicles. These devices serve many purposes. They can compile data from the operation of the car. This includes information such as speed, RPMs of the engine, and driving behavior such as taking sharp turns and acceleration patterns. The port can be used for other purposes as well, for instance installing a cellular phone connection that then offers Wi-Fi connectivity to the vehicle. The TCU 120 shown in FIG. 1B above is often capable of reading data from the OBD-II port and other in-vehicle systems.

The functionality of TARKES described above combined with additional processes performed, for example, in the TCU, can be used to enhance the existing OBD-II port information and other in-car devices by providing definitive information regarding who is driving the car based on an assessment by TARKES as to whose phone entered through the driver's door of the vehicle.

This information could allow, for example, parents to see if their teens were letting someone else drive their vehicle. A notification could be sent, via the telematics unit in the car or via a cooperating app operating on a phone in the car, when an unrecognized user was identified getting into the driver's door.

Information on who was driving could also assist with insurance agencies' data collection using these devices. They could differentiate who was driving based on the phone that entered the vehicle and collect behavioral patterns for each individual.

B. Performing Functions Based on Driver of Vehicle and Passengers

FIG. 12 is a logical flow for one such approach. In a first step 1210, the location of a remote device is determined. Next in step 1212 an event such as a door open or drivers seat occupied is detected. Next in step 1214 a determination is made whether the device associated with the person sitting in the driver's seat is among the authorized drivers. If they are, then the ignition system is enabled. If not, however, then the ignition may be disabled and a report may be generated and transmitted to a parent, or an external monitoring service.

This approach may be useful in a situation in which a family member with Alzheimer's or similar condition, attempted to drive the vehicle. In this situation the family would most likely want to be notified or would not want them to be able to start the car and drive away from the house. However, their family members would not want to be prevented from driving the vehicle if their relative with Alzheimer's were a passenger in the car. The ability to determine who got into the driver's seat would prevent the car to be started only when the family member with Alzheimer's entered the driver's door of the vehicle. If a family member or other approved person were also in the vehicle, then full operation of the vehicle would be allowed. Such control over who can or cannot drive the car could be handled by the push-to-start feature. The same set of restrictions could be applied to others, as well, such as teenagers not allowed to drive by themselves or without adults.

FIG. 13 is an example process performed by the TCU to accommodate this. In a first step 1310 the location of devices near the vehicle are determined. Next a driver and passenger door open (and seats occupied) event is noticed. In step 1314, the vehicle ignition is enabled only if the apparent driver and passenger are among the list of allowed driver/passenger pairs.

C. Texting while Driving

A major safety issue on today's roads involves drivers texting while driving. While there have been many attempts to decrease this practice, there are still many accidents resulting from texting while driving. One such attempt was the iPhone's Do Not Disturb Mode, which users could voluntarily invoke while driving. This mode uses GPS data, and perhaps the accelerometer or other sensor data to detect when someone is driving. Once it recognizes the person is driving, it does not show any notifications and requires the user to unlock the phone to deactivate it. The ability to deactivate the feature is useful when a passenger would like to use the driver's phone.

A "Text-Control" feature of TARKES allow the passenger to use the driver's phone for purposes such as texting but would deactivate such functions when the driver attempted to use such features.

As shown in FIG. 14, the first step 1410 in such a control feature would be to distinguish which person was sitting in the driver's seat. This would be accomplished by having TARKES sense which phone enters via the driver's door or occupies the driver's seat (step 1412). Communications for the device through the antenna array or in other ways can then be blocked (step 1414) by sending a notice to the phone or the mobile network. If a driver tried to "game" the system, by having someone else carry the phone in through their door, the TARKES would assume that both phones from such a pair were the driver's and disable the vehicle or communicate a report of the event (step 1416).

FIG. 15 shows a process where the orientation of the driver's phone can be determined by combining data from the phone and TARKES. As TARKES direction-finding antenna is located in a fixed position inside the car, the absolute locations of phones can be determined inside the vehicle in step 1510. The data from the phone's accelerometer could then provide information regarding the orientation of the phone and which direction the screen was facing in step 1512. Specifically, TARKES could determine if the driver's phone display was oriented in a way such that the driver could see it and take other measures such as disabling the vehicle. Such information could also be communicated to TARKES via BT, Wi-Fi, or simply stored for reporting later. It could also be reported back to another party, a parent perhaps, via any of the phone's normal communication means, either in real-time or after the fact.

It is possible that the phone could be position in a phone holder or sitting on the console. Such locations may or may not be "allowed" locations but could readily be determined and reported by TARKES. If the driver's phone were in fact facing the passenger's side of the vehicle in such a manner that the driver could not conveniently see it (either because it was situated at the wrong angle or too far away), then this use of the driver's phone would not be considered amiss and no report necessarily would be made.

FIG. 16 is an example process for this. First the car location is determined such as via an in-vehicle GPS (step 1610) and a location 'type" is determined. Next speed is determined (step 1612). If the vehicle is stationary at a permitted location type, such at a stop sign, or at a location off the road (in a parking lot), then use is permitted and no report (or disabling) is implemented.

D. Exceptions Based on Speed of Car

There may be some occasions when it is acceptable for the driver to be looking at their phone while in the driver's seat, for example, if the car is stopped, whether at a stop light or having pulled over. In those cases, the driver may need to find directions or send a text. Such a stop could be detected by the phone's or car's GPS unit, or by sensors, such as the accelerometer, in the phone that indicated that the phone was no longer in a moving car. Under those circumstances, the system could deactivate the feature that blocked the phone from being used by the driver. FIG. 16 is a flow for an example process.

Parents could also decide that they wanted to prevent their children from being able to check their phone at a stoplight but let them check their phone if they were pulled over. These situations could be differentiated based on whether the engine was on or if the car was in park. If they were at a stoplight their engine would likely be on and car likely wouldn't be in park. When they pulled over and parked the car they could then be allowed to use their phone. The settings of the feature could be determined by the parents.

E. Warnings that Devices have been Inadvertently Left Behind in the Car

It is not uncommon for drivers or passengers to get out of a car and forget to take things with them. Systems such as these use "tags" sold by Tile, Inc., of San Mateo, Calif., and/or those described in the Bringrr of Boston, Mass. and described in U.S. Pat. No. 9,716,972, System, Method and Device to Interrogate for the Presence of Objects, incorporated herein by reference. These systems and tags are capable of addressing this problem with equipment that could be added to a car. TARKES, however, working together with other systems and sensors in the car, the car itself would now be able to augment or perform this function directly.

In one embodiment, as shown in FIG. 17, TARKES would know when a driver was exiting the car as indicated by the weight sensor in the driver's seat and/or by virtue of the fact that the driver's door opened and then closed (step 1710) and/or by virtue of the Bluetooth sensors track the driver's BT device leave the car (step 1712) (one of the important functions of TARKES). If TARKES noticed that the driver's mobile phone, or other TAG that should not remain in the car, had not moved out with the driver upon exiting (step 1714), the car could sound a reminder (step 1716) such as by softly honking the horn in a distinctive manner, or speak something verbally if there were a speaker outside the car, notify the phone (in the cases where the left-behind TAG was not a phone), notify another TAG if the left-behind item were a phone, or indicate the problem in some other manner such as by contacting the provider of the TAG service. Such an alarm system could also be implemented if the FOB was left in the car.

These alarms, and alarms for other TAGS, could be selectively turned on or off by the user via an app, for any TAG (step 1718). A more general setting could mandate that there be an alarm for any TAG, which had been programmed to be in the car before starting a trip, not be left behind.

Such alarms might not sound if a trip was not completely over (step 1718). If TARKES or the reminder system knew that a trip was intended to end at a certain location, then the Don't Leave Behind reminders could be programmed to not occur until the end of the trip, thus preventing alarms for minor stops along the way, such as stopping for gas or picking up the mail.

F. Automatically Lock when Valuables Left in Car

Automatic locking and unlocking has become a common feature in cars, particularly when associated with a standard RKE system. Users are often able to control the settings for these features, deciding whether or not they'd like their cars to lock automatically when they get a certain distance away from the vehicle, or if they'd like to manually lock their car before they move away from it.

It is not always the case that every person would want the car to automatically lock when the FOB moved from the car. If someone sets their car to lock when they are a certain distance away after a certain period of time, they may be annoyed when they attempt to get into their vehicle without the FOB and it is locked. For example, if they had already put away their FOB and were moving boxes from the car to a house and it was locked every time they returned. On the other hand, if the user requires the car to be locked manually, they might forget to lock their car, which could be an issue if there were to be something valuable in the vehicle.

This tradeoff could be addressed with a smart locking system that was assisted by TARKES. See FIG. 18 for a high-level flow. Drivers could be deemed (step 1810) to be exiting their vehicles based on a sequence of signals—the removal of weight from the driver's seat and/or the closing of the driver's door, for instance (step 1812). The combination of these signals would differentiate when the car door was just opened and when the user actually stepped out of the car. If the driver was deemed to be leaving the car, and a TAG was still in the car, and deemed to be important by the driver (a setting that could be made in an app to control this functionality), then the doors could automatically lock (step 1814) when the driver left the car while such TAG was in the vehicle.

The system could be more intelligent by checking for parameters such as the GPS location and other passengers were in the car. For example, if someone gets out of their car to get the mail, they probably don't want to have the car lock on them, even if they do have valuables in the car. On the other hand, if they are not by their mailbox and say, in a parking lot and they have valuable objects such as a purse or computer in the car, identified by their tags, it would be advantageous to automatically lock the car when leaving it, even if the normal setting was to not lock the doors as the FOB moved away from the car. If other passengers were in the car when the driver exited (as determined by seat weight and/or TAG presence) then the doors would not lock. Thus selective activation of the automatic lock can be advantageous.

Automatic locking could also be a function of how far the driver moved away from the car as determined by either by TARKES or GPS readings on the phone and the car.

G. Emergency Response

The TARKES can also be of use in certain emergency situations. Take for example the scene of an automobile accident. First responders such as police, firefighters and emergency medical technicians often arrive long after the involved incident. Not only are there multiple vehicles each with multiple involved passengers (some of whom may be unconscious), the accident has also witnesses standing around and has attracted on lookers and bystanders. First responders could benefit greatly by knowing immediately identifying who is in the area and tracking their locations.

FIG. 19 is a process flow for the TARKES in such as situation. When an emergency event is detected (step 1910) a mode (step 1912) is entered wherein all devices, not just the paired devices, are located and tracked. This information is then displayed (step 1914) or reported to select authorized devices, which may be the vehicles, the smartphones or tablet computers issued to emergency responders.

H. Implementations Using a Smartphone Instead of a Vehicle Subsystem

Figure 20:
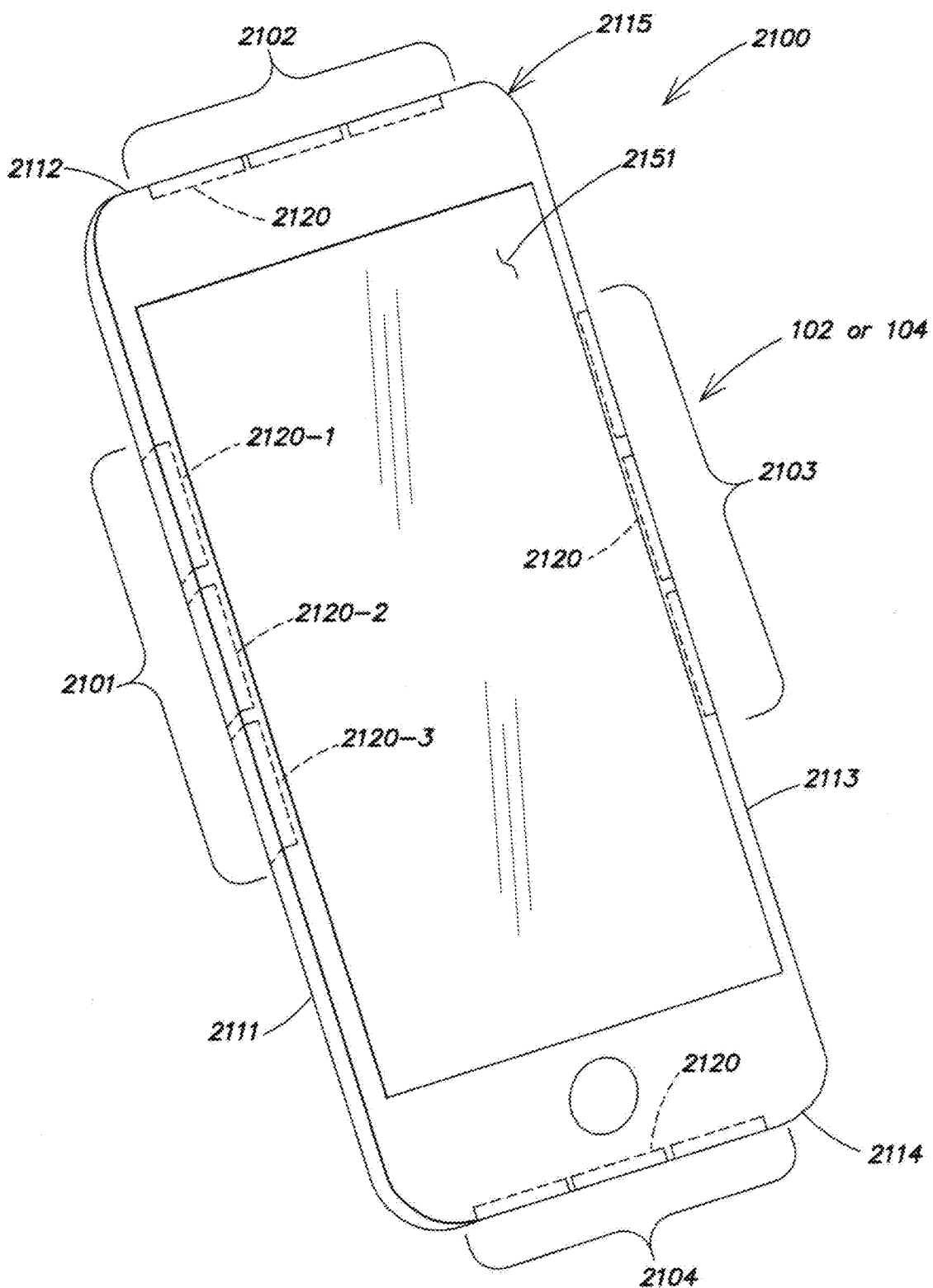
FIG. 20 illustrates another embodiment where a smart phone with directional antennas being used in much the same way as the vehicle-mounted system, such as may be used by an emergency responder.

FIG. 20 is another implementation of an orientation-independent directional antenna (OMAN) array that uses the above algorithms and processes, but which is disposed, instead of within a vehicle, within a wireless device 2100. The wireless device 2100 may include a rectangular housing with a front face, a back face, and four sides or edges. The device may be of the familiar "bar" form factor such as an Apple™ iPhone™ or Android™ smartphone. Along the four sides of the housing are is placed one or more volumetric antenna elements 2120. In one configuration, a set of three volumetric antenna elements are connected as arrays 2101, 2102, 2103, 2104 disposed along or near each of the four sides 2111, 2112, 2113, 2114. The volumetric elements 2120 may each circumscribe a three-dimensional space. In this design, the volumetric elements may each be a planar, conductive, material patch. The conductive material patch may be of a size, for example, to operate efficiently at Fourth-Generation (4G) wireless frequencies. More information about such a device 2100 is in our co-pending US Patent Publication 2018/0191079 previously incorporated by reference.

The foregoing description of example embodiments illustrates and describes systems and methods for implementing a remote key entry and device tracking system but is not intended to be exhaustive or to limited to the precise form disclosed.

For example. certain portions may be implemented as "logic" that performs one or more functions. This logic may include hardware, such as hardwired logic, an application-specific integrated circuit, a field programmable gate array, or may also include in whole or in part, a processor that executes software instructions. Some or all of the logic may therefore be stored in one or more tangible non-transitory computer-readable storage media and may include computer-executable instructions that may be executed by a computer, a data processing system, application specific integrated circuit, programmable gate array or any other state machine. The computer-executable instructions may include instructions that implement one or more embodiments described herein.

It also should be understood that the block and process flow diagrams may include more or fewer elements, be arranged differently, or be represented differently. For example, while a series of steps has been described above with respect to the flow diagrams, the order of the steps may be modified to achieve the same result. In addition, the steps, operations, and steps may be performed by additional or other hardware or software modules or entities, which may be combined or separated to form other modules or entities. For example, while a series of steps has been described with regard to certain Figures, the order of the steps may be modified in other consistent implementations. Further, non-dependent steps may be performed in parallel. Further, disclosed implementations may not be limited to any specific combination of hardware or software.

It will thus now be apparent that other variations and modifications may be made to the described embodiments, with the attainment of some or all of their advantages. The above description of the embodiments, alternative embodiments, and specific examples, were thus given by way of illustration and should not be viewed as limiting. Therefore, it is the object of the appended claims to cover all such variations and modifications as come within the true spirit and scope of the disclosure herein and their equivalents.

The invention claimed is:

1. A method for remote keyless entry direction finding comprising:
   receiving, at an array of orthogonal antenna elements, a radio frequency (RF) signal transmitted by a remote wireless device;
   detecting by a processor the received RF signal to determine positional data representative of a relative direction and distance of the remote control wireless device with respect to a vehicle;
   forwarding the positional data to an in-vehicle processing unit;
   the in-vehicle processing unit further configured for receiving status data representing a current state of one or more systems or components within the vehicle; and
   comparing by the in-vehicle processing unit the positional data and the status data to determine a subsequent action to be taken by at least one component or system associated with the vehicle or the remote wireless device;
   wherein the array of orthogonal antenna elements further comprises two mirror image antennas.

2. The method of claim 1 wherein the subsequent action is one or more of unlocking a door, locking a door, enabling or disabling an ignition system.

3. The method of claim 1 wherein the subsequent action is one or more of initiating an alert that an item was left in the vehicle.

4. The method of claim 1 wherein the processing the received RF signal to determine directional data is calculated using one or more of interferometry, RSSI, or TOF.

5. The method of claim 1 wherein the array of orthogonal antenna elements is a CALPRO.

6. The method of claim 1 wherein the array of orthogonal antenna elements is an ORIAN array.

7. The method of claim 1 wherein the subsequent action is one or more of controlling access to the vehicle, or controlling operation of the vehicle.

\* \* \* \* \*